(12) United States Patent
Schroers et al.

(10) Patent No.: US 10,832,383 B2
(45) Date of Patent: Nov. 10, 2020

(54) SYSTEMS AND METHODS FOR DISTORTION REMOVAL AT MULTIPLE QUALITY LEVELS

(71) Applicant: Disney Enterprises, Inc., Burbank, CA (US)

(72) Inventors: Christopher Schroers, Zürich (CH); Mauro Bamert, Zürich (CH); Erika Doggett, Burbank, CA (US); Jared McPhillen, Burbank, CA (US); Scott Labrozzi, Raleigh-Durham, NC (US); Romann Weber, Zürich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 145 days.

(21) Appl. No.: 16/167,388

(22) Filed: Oct. 22, 2018

(65) Prior Publication Data

US 2019/0333190 A1   Oct. 31, 2019

Related U.S. Application Data

(60) Provisional application No. 62/664,868, filed on Apr. 30, 2018.

(51) Int. Cl.
*G06T 5/20* (2006.01)
*G06N 3/08* (2006.01)
*G06T 5/00* (2006.01)

(52) U.S. Cl.
CPC .............. *G06T 5/002* (2013.01); *G06N 3/08* (2013.01); *G06T 5/20* (2013.01)

(58) Field of Classification Search
None
See application file for complete search history.

(56) References Cited

U.S. PATENT DOCUMENTS

| 2018/0374245 | A1* | 12/2018 | Xu ........................ G06T 11/008 |
| 2019/0108904 | A1* | 4/2019 | Zhou ..................... G06T 11/003 |
| 2019/0294108 | A1* | 9/2019 | Ozcan ................... G03H 1/2202 |
| 2019/0325621 | A1* | 10/2019 | Wang ..................... A61B 6/037 |

* cited by examiner

*Primary Examiner* — Idowu O Osifade
(74) *Attorney, Agent, or Firm* — Artegis Law Group, LLP

(57) ABSTRACT

Systems and methods for distortion removal at multiple quality levels are disclosed. In one embodiment, a method may include receiving training content. The training content may include original content, reconstructed content, and training distortion quality levels corresponding to the reconstructed content. The reconstructed content may be derived from distorted original content. The method may also include training distortion quality levels corresponding to the reconstructed content. The method may further include receiving an initial distortion removal model. The method may include generating a conditioned distortion removal model by training the initial distortion removal model using the training content. The method may further include storing the conditioned distortion removal model.

20 Claims, 10 Drawing Sheets
(5 of 10 Drawing Sheet(s) Filed in Color)

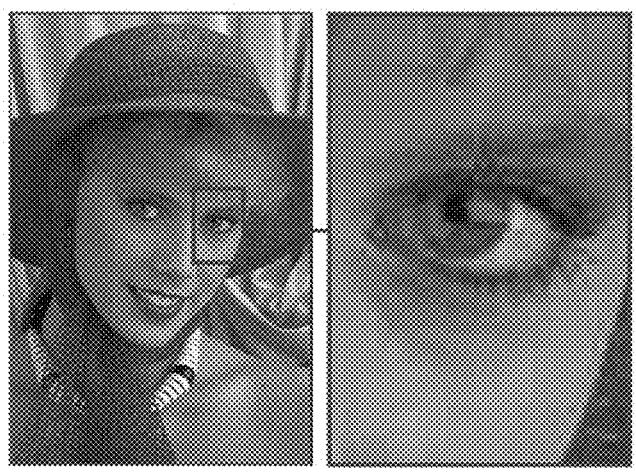
FIG. 5A FIG. 5B
FIG. 5C FIG. 5D
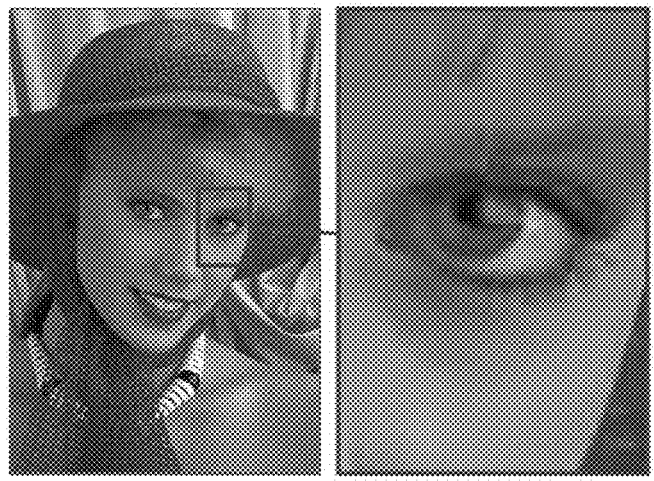
FIG. 5E FIG. 5F

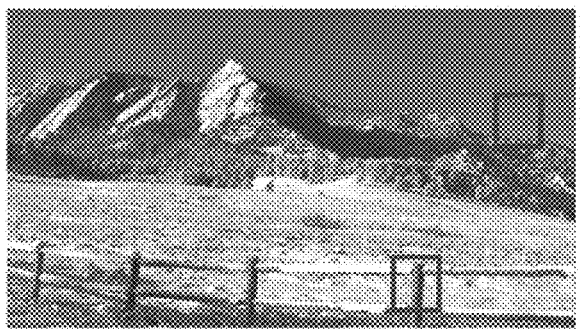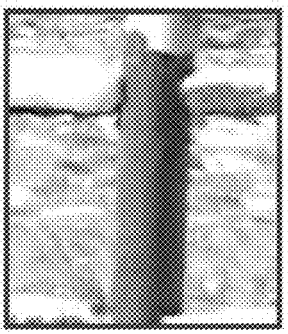
FIG. 7A FIG. 7B
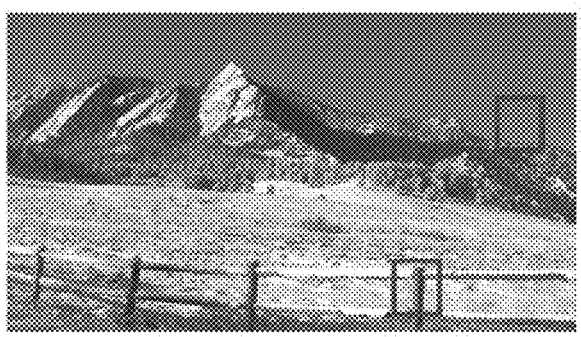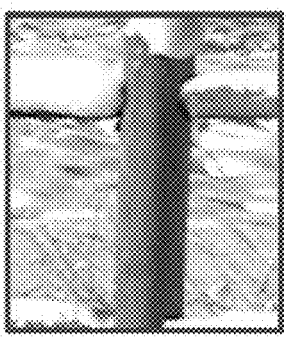
FIG. 7C FIG. 7D
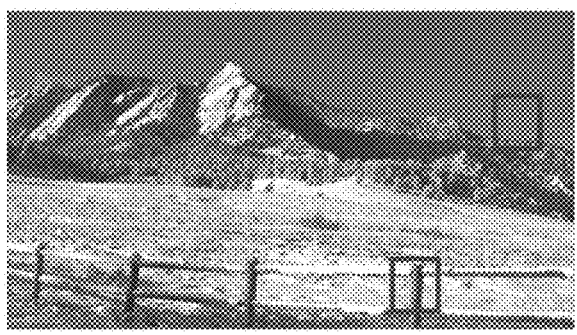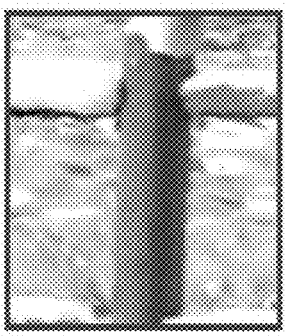
FIG. 7E FIG. 7F
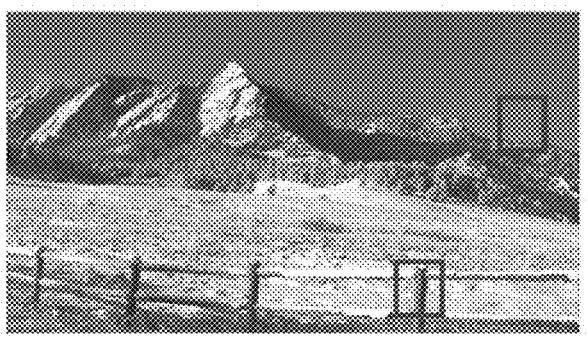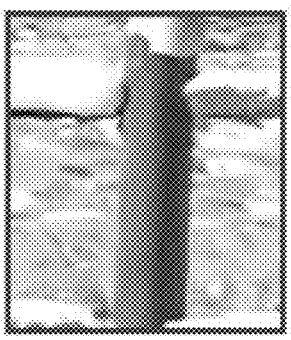
FIG. 7G FIG. 7H

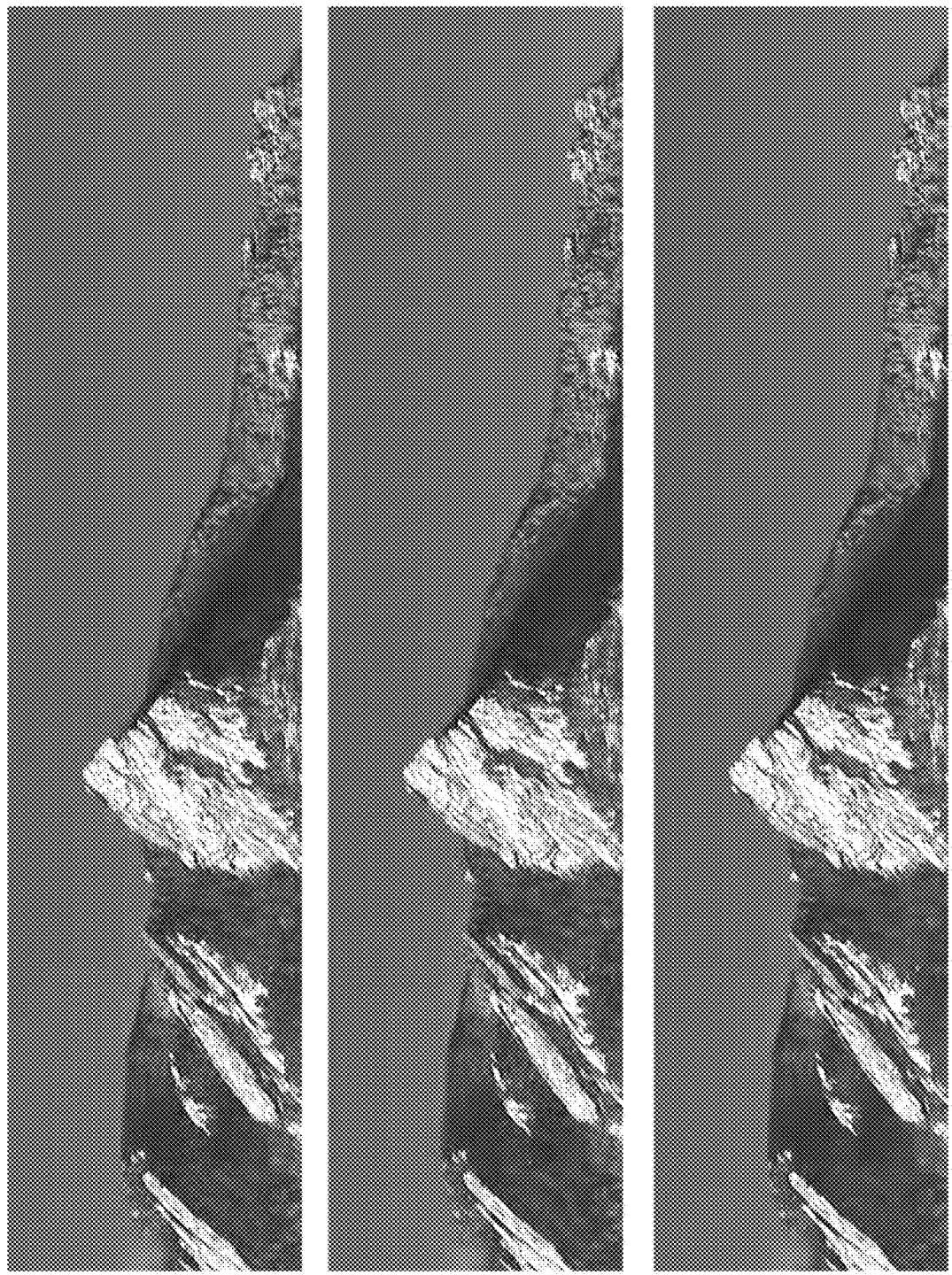

SYSTEMS AND METHODS FOR DISTORTION REMOVAL AT MULTIPLE QUALITY LEVELS

CROSS-REFERENCE TO RELATED APPLICATIONS

The present application claims priority to U.S. Patent Application No. 62/664,868, filed on Apr. 30, 2018, which is incorporated herein by reference in its entirety.

TECHNICAL FIELD

The present disclosure relates generally to distortion and artifact removal.

BRIEF SUMMARY OF THE DISCLOSURE

Embodiments of the disclosure are directed to systems and methods trained on multiple, different training quality levels that remove distortion from media content of varying quality levels that may overlap with the multiple, different training quality levels.

In one embodiment, a computer-implemented method includes: receiving training content. The training content may include: original content; reconstructed content derived from distorted original content; and training distortion quality levels corresponding to the reconstructed content. The computer-implemented method may also include receiving an initial distortion removal model; generating a conditioned distortion removal model by training the initial distortion removal model using the training content; and storing the conditioned distortion removal model.

In embodiments, the method may further include: receiving target content. The target content may have one or more target distortion quality levels. The method may also include applying the conditioned distortion removal model to the target content to generate corrected target content.

In embodiments, the initial distortion removal model and the conditioned distortion removal model comprise one or more user-defined output branches based on one or more distortion quality levels.

The computer-implemented method of claim 3, wherein the initial distortion removal model comprises two branches, wherein a first set of training content corresponding to a first branch passes through a first set of convolutional layers, and a second set of training content corresponding to a second branch passes through a first set of convolutional layers and a second set of convolutional layers.

In embodiments, training the initial distortion removal model using the training content includes: applying the first set of training content to the first set of convolutional layers; applying at least one of the first set of training content to the second set of convolution layers; applying the second set of training content to the first set and the second set of convolutional layers; and when the second branch is conditioned, training the first branch and the second branch with equal weighting for the first branch and the second branch.

In embodiments, the training distortion quality levels includes at least one different individual value compared to the one or more target distortion quality levels.

In embodiments, the initial distortion removal model and the conditioned distortion removal model include a convolutional neural network.

In embodiments, the initial distortion removal model and the conditioned distortion removal model comprise an activation function.

In embodiments, the conditioned distortion model is trained to remove distortions from target content.

In one embodiment, a computer-implemented method includes: receiving target content. The target content may have multiple distortion quality levels. The computer-implemented method may also include receiving a conditioned distortion removal model. The conditioned distortion removal model may have been conditioned by training an initial distortion removal model using training content. The training content comprises original content and corresponding reconstructed content, each reconstructed content having a given distortion quality level. The computer-implemented method may also include applying the conditioned distortion removal model to the target content to generate corrected target content.

In embodiments, the conditioned distortion removal model comprises one or more user-defined output branches based on the multiple distortion quality levels.

In embodiments, the target content is corrected based on a given distortion quality level of a given target content corresponding to one of the one or more user-defined output branches of the conditioned distortion removal model.

In embodiments, the conditioned distortion removal model comprises two branches, wherein a first set of target content corresponding to a first branch passes through a first set of convolutional layers, and a second set of target content corresponding to a second branch passes through a first set of convolutional layers and a second set of convolutional layers.

In embodiments, the initial distortion removal model and the conditioned distortion removal model comprise a convolutional neural network.

In embodiments, the content comprises one or more of an image and a video.

In embodiments, the content comprises one or more of standard content, high definition (HD) content, ultra HD (UHD) content, 4k UHD content, and 8k UHD content.

In one embodiment a system for artifact removal may include electronic storage; one or more physical computer processors configured by machine-readable instructions to: obtain target media content. The target media content has multiple distortion quality levels. The one or more physical computer processors may be further configured by machine-readable instructions to: obtain, from the electronic storage, a conditioned distortion removal model. The conditioned distortion removal model having been conditioned by training an initial distortion removal model using training media content. The training media content comprises original media content and corresponding reconstructed media content, each reconstructed media content having a given distortion quality level. The one or more physical computer processors may also be configured by machine-readable instructions to: apply the conditioned distortion removal model to the target media content to generate corrected target media content using the one or more physical computer processors.

In embodiments, the conditioned distortion removal model comprises one or more user-defined output branches based on one or more distortion quality levels.

In embodiments, the target content is corrected based on a given distortion quality level of a given target content corresponding to one of the one or more branches of the conditioned distortion removal model.

In embodiments, the initial distortion removal model and the conditioned distortion removal model comprise a convolutional neural network.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further aspects of the present disclosure will be more readily appreciated upon review of the detailed description of the various disclosed embodiments, described below, when taken in conjunction with the accompanying figures.

FIG. 5A illustrates a JPEG compressed image with quality level 20 in accordance with embodiments of the disclosed technology.

FIG. 5B illustrates a JPEG compressed image with quality level 20 in accordance with embodiments of the disclosed technology.

FIG. 5C illustrates an original image in accordance with embodiments of the disclosed technology.

FIG. 5D illustrates an original image in accordance with embodiments of the disclosed technology.

FIG. 5E illustrates an image that has applied a progressive distortion removal model in accordance with embodiments of the disclosed technology.

FIG. 5F illustrates an image that has applied a progressive distortion removal model, in accordance with embodiments of the disclosed technology.

FIG. 7A illustrates a H.264 compressed frame with constant rate factor (CRF) 40 and in-loop filter turned off in accordance with embodiments of the disclosed technology.

FIG. 7B illustrates a H.264 compressed frame with constant rate factor (CRF) 40 and in-loop filter turned off in accordance with embodiments of the disclosed technology.

FIG. 7C illustrates an original frame in accordance with embodiments of the disclosed technology.

FIG. 7D illustrates an original frame in accordance with embodiments of the disclosed technology.

FIG. 7E illustrates a H.264 compressed frame with constant rate factor (CRF) 40 and in-loop filter turned on in accordance with embodiments of the disclosed technology.

FIG. 7F illustrates a H.264 compressed frame with constant rate factor (CRF) 40 and in-loop filter turned on in accordance with embodiments of the disclosed technology.

FIG. 7G illustrates an image that has applied a progressive distortion removal model on the not filtered H.264 frame of FIGS. 7A and 7B in accordance with embodiments of the disclosed technology.

FIG. 7H illustrates an image that has applied a progressive distortion removal model on the not filtered H.264 frame of FIGS. 7A and 7B in accordance with embodiments of the disclosed technology.

FIG. 9 illustrates an unfiltered image, an image filtered using a H.265 filter, and the image filtered using the progressive distortion removal model. H.265 compressed frame with constant rate factor (CRF) 35 and in-loop filter turned off in accordance with embodiments of the disclosed technology.

Figure 1:
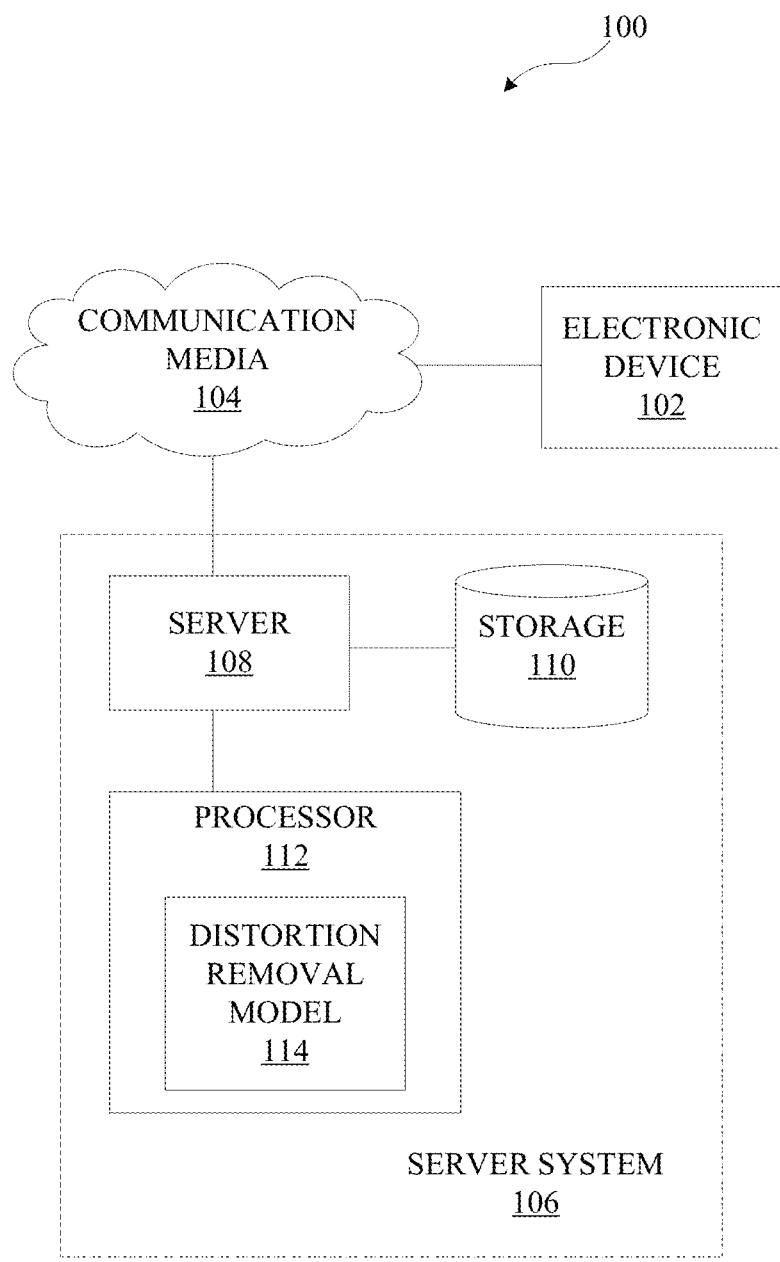
FIG. 1 illustrates an example system for correcting target content with multiple untrained distortion quality levels, in accordance with various embodiments.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Some present uses of lossy image and video codecs may contain one or more filters that are designed to reduce distortions and compression artifacts. In video codecs, such filtering is a critical in-loop processing stage because reconstructed images are used as references for future temporal compression decisions. While deep-learning-based image processing approaches may offer a better filtering result because they are able to learn a more complex mapping between the distorted, reconstructed image and the original image, existing deep learning approaches are often fixed on a single, specific degradation/distortion quality level, which limits the scalability of such an approach. In lossy video coding, the degradation/distortion quality level can change from frame to frame, regulated by target output bitrates, and as such, single degradation/distortion quality level approaches are not viable. Moreover, existing methods generally consider distortion removal for one specific encoding and decoding algorithm. Accordingly, most of the networks need to be retrained for other codecs and quality levels.

Accordingly, various embodiments of the present disclosure are directed to a method or system that is trained using multiple, different quality levels and receives target content of various untrained quality levels and generates corrected content. Content may include various media content, such as, for example, videos and images, which may not be encoded. Content may come in various resolutions, such as standard, high definition (HD), ultra HD (UHD), 4k UHD, 8k UHD, and/or other resolutions. In embodiments, an initial distortion removal model may be trained using training content. The training content may include compressed and/or distorted content, each piece of content having a quality level, and the corresponding original content. In some embodiments, the training content may include multiple, different quality levels. After training the initial distortion removal model, a conditioned distortion removal model may be generated. In some embodiments, target content having different quality levels than the training content may be applied to the conditioned distortion removal model. The conditioned distortion removal model may correct and/or optimize the target content to remove distortions and/or artifacts in the target content; thereby generating corrected target content. The conditioned distortion removal model may replace or augment existing filters in order to achieve an increased quality of compressed and/or distorted content and increased flexibility for accepting different content having different quality levels than the quality levels the initial distortion removal model was trained on.

Before describing the technology in detail, it may be useful to describe an example environment in which the presently disclosed technology can be implemented. FIG. 1 illustrates one such example environment 100.

Environment 100 may be used in connection with implementing embodiments of the disclosed systems, methods, and devices. By way of example, the various below-described components of FIG. 1 may be used to remove distortion from reconstructed content. Reconstructed content may be derived from content that has been compressed, modified, altered, and/or otherwise distorted. For example, original content may be compressed, based on a given quality level, and transmitted to/from electronic device 102 via server system 106. Accordingly, artifacts and distortions may exist in the compressed content. The content may include videos, images, and/or other visual media content. Server system 106 may include distortion removal model 114, which is able to receive target content having multiple untrained quality levels, as will be described herein. Distortion removal model 114 may generate corrected content to be sent to/from electronic device 102.

Distortion removal model 114 may be stored in storage 110. In embodiments, an initial distortion removal model may be trained on one or more training quality levels in server system 106 to generate a conditioned distortion removal model, as will be described herein. The training content may include the one or more training quality levels. The one or more training quality levels may include multiple, different quality levels. The conditioned distortion removal model may be applied to target content with one or more target quality levels to generate corrected content. In some embodiments, the one or more target quality levels may have different values than the training quality levels.

Electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and/or receive requests to send content to another user. In some embodiments, electronic device 102 may apply a conditioned distortion removal model to target content. In embodiments, electronic device 102 may store distortion removal model 114.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including content, metadata, quality levels, user input, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

As mentioned above, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, and/or distortion removal model 114 to one another in addition to other elements of environment 100. In example implementations, communication media 104 may be or include a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, metadata, quality levels, user input, security and encryption information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include distortion removal model 114 capable of receiving target content, analyzing target content, and otherwise processing content and generating corrected content that server system 106 has collected, received, etc. based on requests from, or coming from, electronic device 102. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, and/or distortion removal model components 114.

Figure 2:
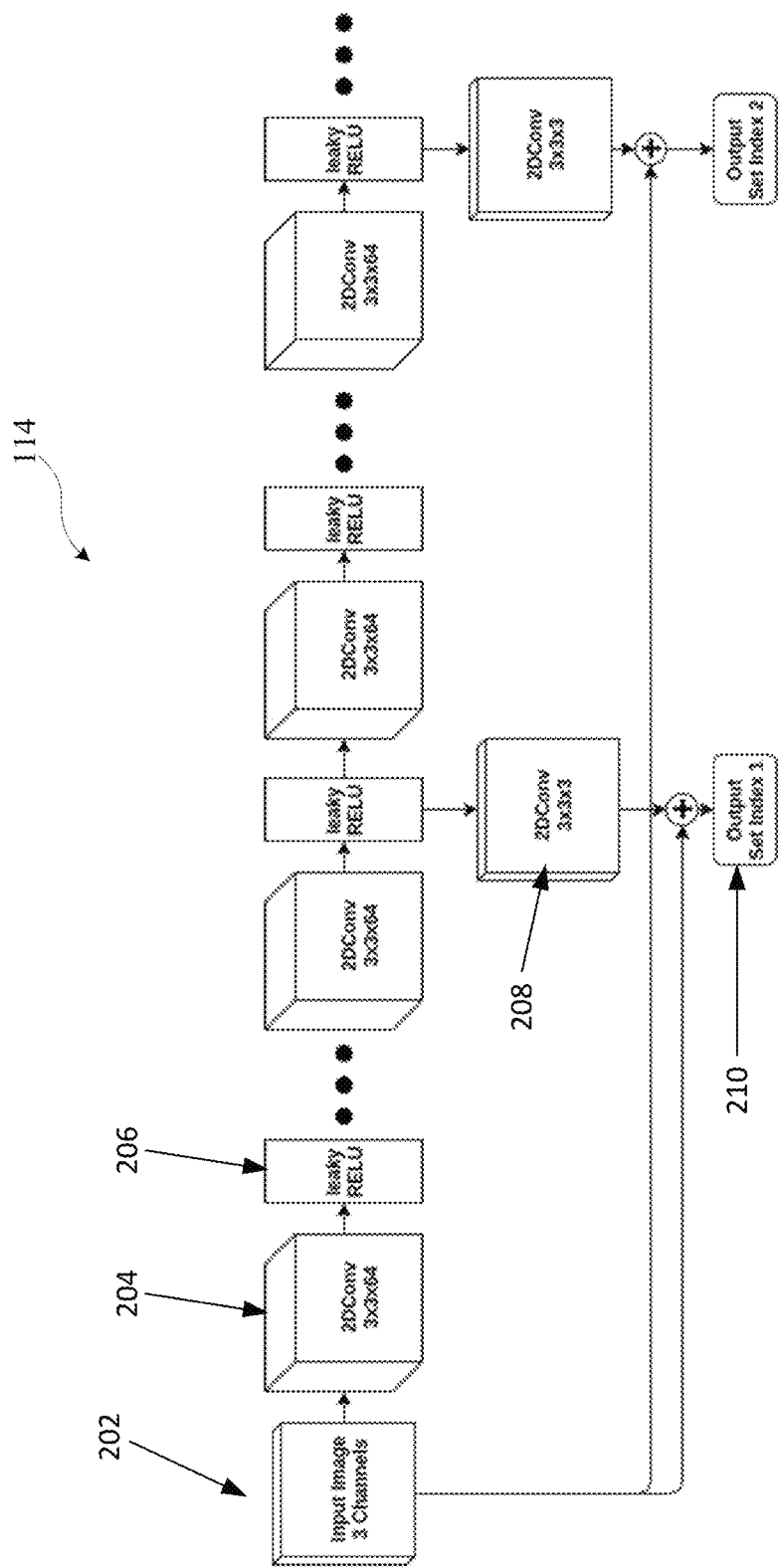
FIG. 2 illustrates an example distortion removal model in accordance with embodiments of the disclosed technology.

FIG. 2 illustrates an example distortion removal model, in accordance with embodiments of the disclosed technology. As illustrated, distortion removal model 114 may be a progressive convolutional network which branches out at different depths. As described above, in some embodiments, system 100 may be used to train distortion removal model 114. In embodiments, system 100 may retrieve or obtain a conditioned distortion removal model from storage 110. The architecture of distortion removal model 114 may include multiple layers of 2DConv 3×3×64 204 and leaky Rectified Linear Units (ReLU) 206. As illustrated, there are skip connections from the input to all outputs and convolutional layers in between. The number of input channels for a given layer may be based on the output from the previous layer. In embodiments, the number of layers for each quality set or output set index 210, as well as the number of quality sets, may be the same for all compressions, distortions, etc. used for training. In one example, there are three different total quality sets, the first starting at 10 layers, the second adding 5 more, and the last adding 3 more, excluding the first and the last convolution.

As illustrated, 2DConv 3×3×64 204 may include a 2D convolution with a 3×3 kernel size and 64 output channels or, for example, feature maps. Each feature map may be used to identify, determine, and or analyze whether an examined portion of the target content includes distortions or artifacts. Each feature map may have a corresponding weight matrix to determine the effect the examined portion of the target content has with respect to generating corrected content. Leaky ReLU 206 may be a non-saturated activation function. At the deepest output, in one example, there are twenty convolutional layers total. Output set index 210 may be an output branch based on a given quality level. It should be appreciated that this is an embodiment of the distortion removal model, and a different number of input channels, layers, activation functions, feature maps, output channels, and other components may be used. It should be appreciated that other activation functions may be used in combination with different convolutional networks.

Having described the general architecture, example training techniques are described in more detail. Training content may include original content, reconstructed content, and corresponding quality levels of the reconstructed content. A variety of techniques may be used to train distortion removal model 114. In one example, the original content is denoted as f in the below equation, and the reconstructed output content of a distortion method with a distortion quality level Q as $I':=I_{cQ}$ in the below equation. In one example, a convolutional network, f, is trained to reconstruct the content I given its distorted counterpart I'. This is based on solving an optimization problem of the form $$\operatorname*{argmin}_{f} \sum_{I \in X} l(I, f(I')); \qquad (1)$$

where l is a loss metric and X is the set of original content. For the convolutional network, f, an additional argument may be introduced which allows the network to branch out at different depths. For less distorted I' (depending on Q), branching out begins earlier than for more distorted I'. Accordingly, a progressive parameter is added. The new parameter depends on the distortion quality level Q for which a decision function s(•) is defined. As an example, for JPEG, the function may be defined as:

$$s(q) = \begin{cases} 1 & \text{if } q \geq 40 \\ 2 & \text{if } 20 < q < 40 \\ 3 & \text{if } q \leq 20 \end{cases}$$

In embodiments, the distortion quality level Q can be determined in various ways and may be user-defined. For example, in still image compression (JPEG, etc.), a compression quality level Z is often an input to the compression process and Q can be derived from Z, Q=g(Z), if not Z itself. Similarly, some approaches to video compression attempt to produce a consistent output quality also by supplying a compression quality level Z as input to the encoding process. The Constant Rate Factor (CRF) of x264 and x265 is one such example. Again, the distortion quality level may be Q=g(Z). In some compression approaches, the distortion of the compressed output content I' varies frame to frame depending on bitrate targets, buffer modeling, and group of picture (GOP) frame type. In such cases, the distortion quality level Q of I' may need to be determined dynamically. In these cases Q=g(I'). Ultimately, the following problem is solved:

$$\underset{f}{\operatorname{argmin}} \sum_{I \in \mathcal{I}} \sum_{q \in Q(C)} \|I - f(I', s(q))\|_1$$

where Q(C) denotes all the quality levels of distortion method C.

Another technique used to train distortion removal model 114 may be splitting the training content into patches (e.g., 128×128) that align to the distortion block size used in the distortion method. If there are multiple sizes used by the distortion method, the biggest possible block size may be used. As a result, the performance of distortion removal model 114 can be boosted by training on smaller content patches, while still preserving the positions of the block artifacts. Additionally, all patches may not be trained, instead a user-selected fixed amount of patches per content may be randomly sampled, and the patches may be aligned according to blocks used in the distortion method.

Figure 3:
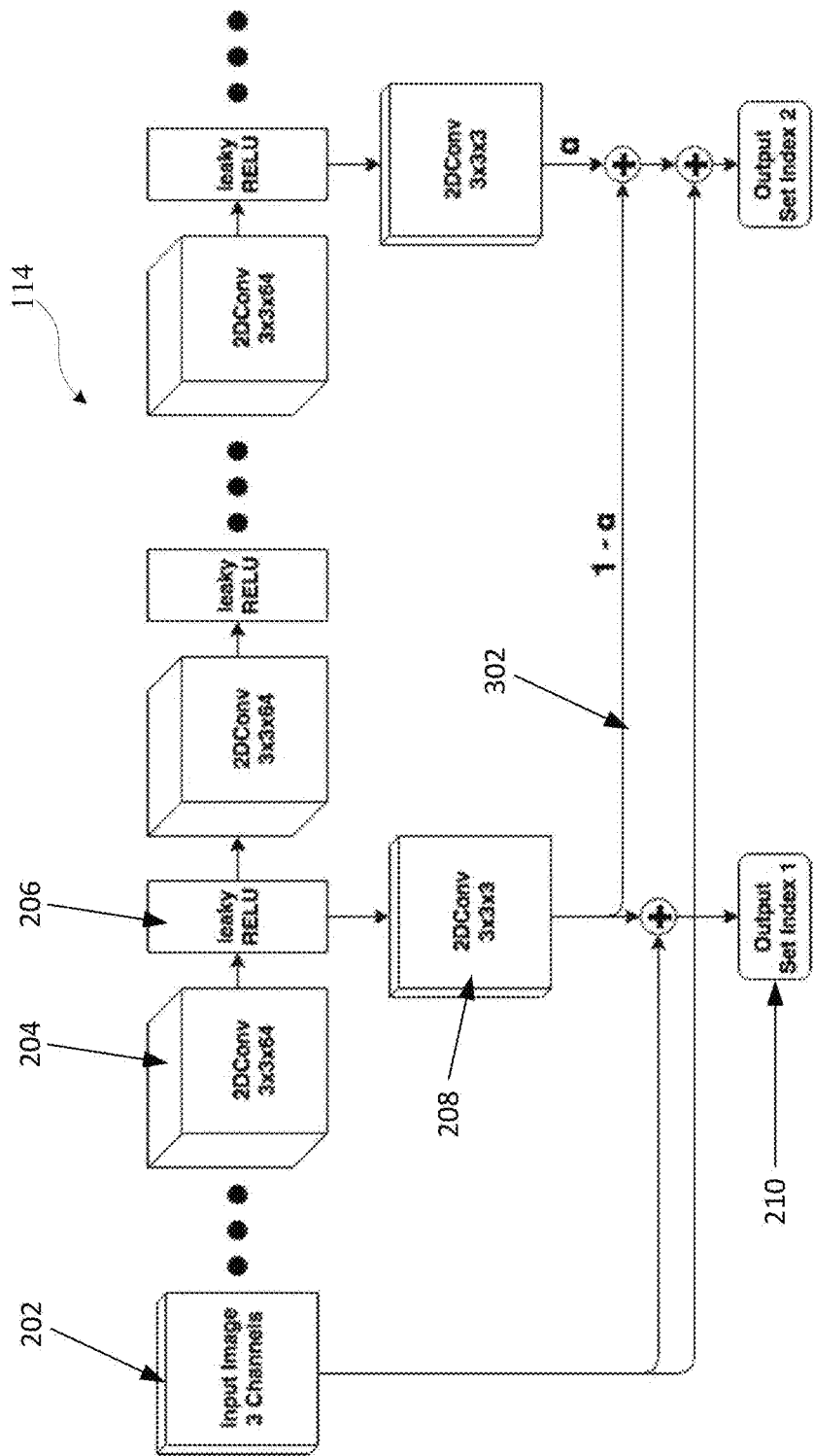
FIG. 3 illustrates an example curriculum learning system in accordance with embodiments of the disclosure.

An additional technique may be curriculum learning. Curriculum learning may include gradually adding more complex data, or content, into the distortion removal model to assist the training. Referring to FIG. 3, the first quality set is trained with one specific distortion quality level $Q_1$ until the loss is almost converged. Then, the second quality set may be activated with content from distortion quality level $Q_2$ but instead of using the output of set index two (see FIG. 2), a linear combination of set one and set two output may be used:

$$OSI_i = \alpha * OSI_i + (1-\alpha) OSI_{i-1}$$

where $OSI_1$ refers to the output set index, i, and with a value 302, the second output set is able to be slowly blended. At first, while training the $Q_2$ content, content may be input from previous distortion quality level $Q_1$ with a probability of 50%. If there is more than one previous level, the 50% probability may be uniformly split. For example, if there are two previous levels, for the third output set index, the 50% probability of using content from $Q_1$ and $Q_2$ may be uniformly split so that the probability of using content from $Q_1$ is 25% and the probability of using content form $Q_2$ is 25%. This allows the training to focus on the current set of content while blending in training of the previous content. When a is approximately 1, the next output may be introduced using the same procedure as described above. After the last output is blended in, the distortion removal model may be trained over all outputs with equal probability.

For each distortion method, the distortion removal model may be trained independently. For example, only to give a sense of scale, a learning rate of $3*10^{-4}$ may be used. It will be appreciated that a different learning rate may be defined by a user. The training content used for training is different for various content (e.g., images and videos). During training, content from one or more quality levels may be used depending on the input distortion method. For example, for JPEG and WebP, the quality levels may be $Q_1=40$, $Q_2=30$, and $Q_3=20$ from the valid range of 1 to 100, which refers to the compression factor. BPG, H.265 (HEVC), and H.264 use different metrics with values ranging from 0 to 51. In BPG, the metric is called a quantization parameter (QP), and for H.265 and H.264, the metric is a constant rate factor (CRF). The CRF is a more sophisticated version of QP that adapts the QP on the frame level. It will be appreciated that other distortion methods may be utilized with the present disclosure.

Now that example training techniques have been disclosed, example applications are disclosed herein. Target content (e.g., reconstructed content) may be received by distortion removal model 114 at input 202 having, for example, 3 channels, R, G, and B. In some embodiments, a quality level corresponding to the target content may be received. The quality level may be a different quality level than the conditioned distortion removal model was trained on. For example, the conditioned distortion removal model may have been trained on quality levels 20, 40, and 70. Target content distortion quality levels may range from 12 to 85. Nonetheless, conditioned distortion removal model may be able to correct all of the target content.

The target content may be sent through an initial convolutional layer (e.g., 2DConv 3×3×64 204 and leaky ReLU 206). The target content may be sent through additional convolutional layers based on the quality level of a given target content. Accordingly, the target content may be corrected and may be the same size as the target content.

Figure 4:
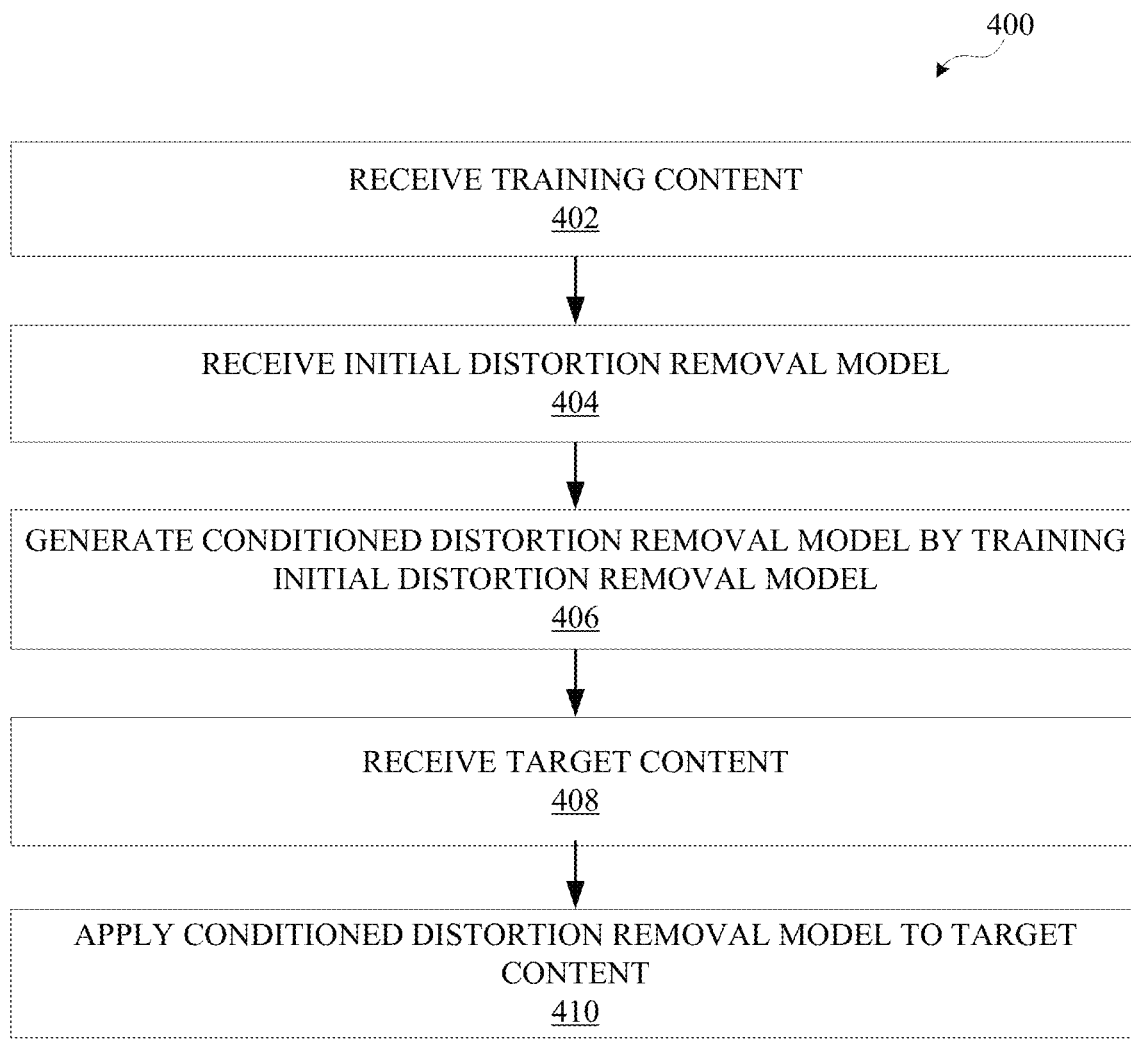
FIG. 4 illustrates an operational flow diagram illustrating an example process for training an distortion removal model using training content and applying the distortion removal model to target content, in accordance with one embodiment

FIG. 4 illustrates an operational flow diagram illustrating an example process for training an initial distortion removal model using training content and applying the distortion removal model to target content, in accordance with one embodiment. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 1000, described herein and referenced with respect to at least FIGS. 1 and 9, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 402, training content may be received. The training content may include original content, reconstructed content based on distortions to the original content, and distortion quality levels of the reconstructed content. For example, original content may be an original image. Reconstructed content may be a JPEG of the image. The corresponding distortion quality level may be about 40.

At operation 404, an initial distortion removal model may be received. An initial distortion removal model may include a progressive convolutional neural network that includes multiple branches based on distortion quality levels. The branches may be user-defined based on a given distortion method. For example, different distortion methods may use different metrics, such as JPEG, BPG, H.264, and H.265. It will be appreciated that a user-defined branch may work for multiple distortion methods.

The initial distortion removal model may include multiple feature maps in the convolutional layer to examine, identify, determine, and analyze any distortions or artifacts in the reconstructed content, as well as activation functions.

At operation 406, a conditioned distortion removal model may be generated. The conditioned distortion removal model may be conditioned by training the initial distortion removal model using the training content. Continuing the example above, using the original image as an end goal and the distortion quality level as a parameter, the reconstructed image is trained to remove distortions and artifacts and generate corrected images as described above. In some embodiments, a curriculum learning approach may be used to improve the conditioned distortion removal model.

At operation 408, target content may be received. Target content may include reconstructed content and corresponding distortion quality levels. The distortion quality levels of the target content may be different from the distortion quality levels of the training content.

At operation 410, a conditioned distortion removal model may be applied to the target content. Accordingly, corrected content is generated by the conditioned distortion removal model. For example, target content below a distortion quality level 20 may be passed through a first set of convolution layers to reach the first branch of the conditioned distortion removal model, while target content above a distortion quality level 20 may be passed through a first set and a second set of convolution layers to reach the second branch of the conditioned distortion removal model. In some embodiments, the corrected target content is presented to a user.

FIGS. 5-8 illustrate applications of the technology disclosed herein on multiple distortion methods. FIGS. 5A-5F illustrate images of a face from the Kodak PhotoCD dataset with various effects applied. Referring to FIGS. 5A and 5B, JPEG compressed image with distortion quality level 30 are depicted. FIGS. 5C and 5D illustrate an original image. FIGS. 5E and 5F illustrate using the progressive distortion removal model disclosed herein. As illustrated, the FIGS. 5E and 5F appear less pixelated, as a result of the removal of the compression artifacts.

Figure 6H:
FIG. 6H illustrates an image that has applied a progressive distortion removal model on the filtered WebP images of FIGS. 6E and 6F in accordance with embodiments of the disclosed technology.
Figure 6G:
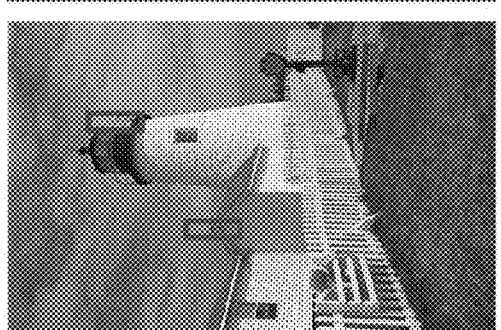
FIG. 6G illustrates an image that has applied a progressive distortion removal model on the filtered WebP images of FIGS. 6E and 6F in accordance with embodiments of the disclosed technology.
Figure 6D:
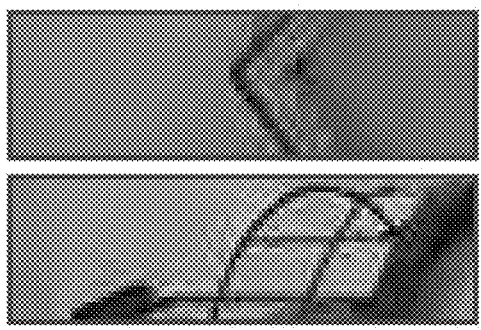
FIG. 6D illustrates a WebP compressed image with quality level 20 and in-loop filter turned off in accordance with embodiments of the disclosed technology.
Figure 6C:
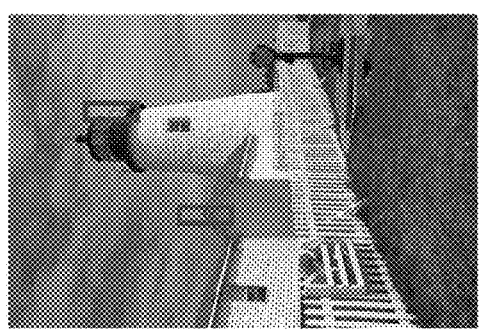
FIG. 6C illustrates a WebP compressed image with quality level 20 and in-loop filter turned off in accordance with embodiments of the disclosed technology.
Figure 6F:
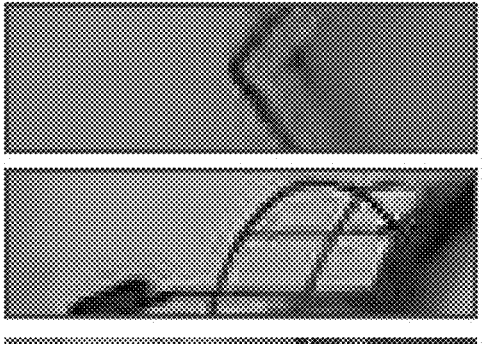
FIG. 6F illustrates a WebP compressed image with quality level 20 and in-loop filter turned on in accordance with embodiments of the disclosed technology.
Figure 6E:
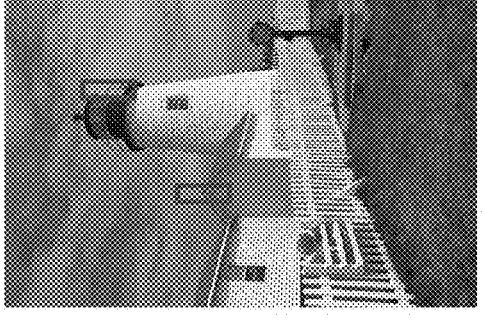
FIG. 6E illustrates a WebP compressed image with quality level 20 and in-loop filter turned on in accordance with embodiments of the disclosed technology.
Figure 6B:
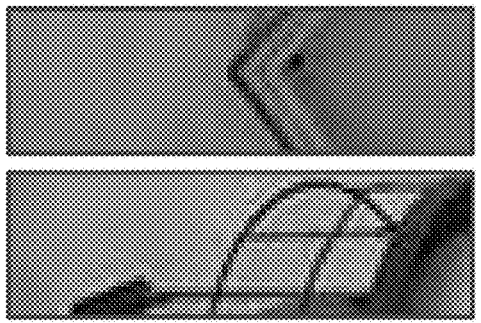
FIG. 6B illustrates a WebP original image in accordance with embodiments of the disclosed technology.
Figure 6A:
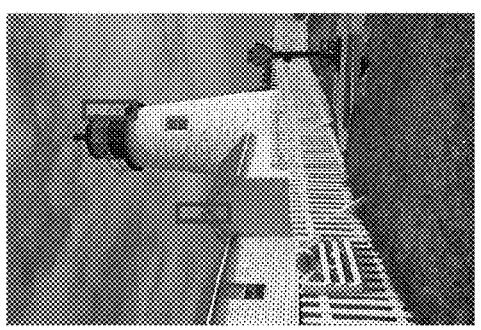
FIG. 6A illustrates a WebP original image in accordance with embodiments of the disclosed technology.

FIGS. 6A-6F illustrate images of a light tower from the Kodak PhotoCD dataset. Referring to FIGS. 6A and 6B, an original image is depicted. FIGS. 6C and 6D illustrate a WebP compressed image with distortion quality level 30 and in-loop filter turned off. FIGS. 6E and 6F illustrate a WebP compressed image with distortion quality level 30 and in-loop filter turned on. FIGS. 6G and 6H illustrate using the progressive distortion removal model disclosed herein on the filtered WebP images FIGS. 6E and 6F. As compared to FIGS. 6E and 6F, some of the fuzziness is smoothed out, as a result of the removal of the compression artifacts.

FIGS. 7A-7H illustrate a frame with a mountain from the Xiph.org Video Test Media dataset. Referring to FIGS. 7A and 7B, a H.264 compressed frame with constant rate factor (CRF) 50 and in-loop filter turned off is depicted. FIGS. 7C and 7D illustrate an original frame. FIGS. 7E and 7F illustrate a H.264 compressed frame with constant rate factor (CRF) 50 and in-loop filter turned on. FIGS. 7G and 7H illustrate using the progressive distortion removal model disclosed herein on the unfiltered H.264 frame FIGS. 7A and 7B. Compared to FIGS. 7A and 7B, FIGS. 7G and 7H, fuzziness and granularity is less pronounced, especially in the far right image.

Figure 8A:
FIG. 8A illustrates a H.264 compressed frame with constant rate factor (CRF) 35 and in-loop filter turned off in accordance with embodiments of the disclosed technology.
Figure 8B:
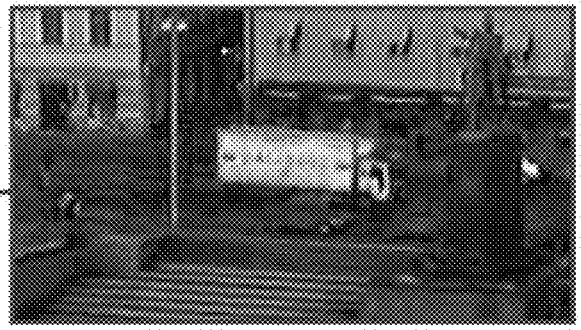
FIG. 8B illustrates a H.264 compressed frame with constant rate factor (CRF) 35 and in-loop filter turned off in accordance with embodiments of the disclosed technology.
Figure 8C:
FIG. 8C illustrates an original frame in accordance with embodiments of the disclosed technology.
Figure 8D:
FIG. 8D illustrates an original frame in accordance with embodiments of the disclosed technology.
Figure 8E:
FIG. 8E illustrates a H.264 compressed frame with constant rate factor (CRF) 35 and in-loop filter turned on in accordance with embodiments of the disclosed technology.
Figure 8F:
FIG. 8F illustrates a H.264 compressed frame with constant rate factor (CRF) 35 and in-loop filter turned on in accordance with embodiments of the disclosed technology.
Figure 8G:
FIG. 8G illustrates an image that has applied a progressive distortion removal model on the not filtered H.264 frame of FIGS. 8A and 8B in accordance with embodiments of the disclosed technology.
Figure 8H:
FIG. 8H illustrates an image that has applied a progressive distortion removal model on the not filtered H.264 frame of FIGS. 8A and 8B in accordance with embodiments of the disclosed technology.

FIGS. 8A-8B illustrate a frame of Stockholm from the Xiph.org Video Test Media dataset. Referring to FIGS. 8A and 8B, a H.264 compressed frame with constant rate factor (CRF) 56 and in-loop filter turned off is depicted. FIGS. 8C and 8D illustrate an original frame. FIGS. 8E and 8F illustrate a H.264 compressed frame with constant rate factor (CRF) 56 and in-loop filter turned on. FIGS. 8G and 8H illustrate using the progressive distortion removal model disclosed herein on the not filtered H.264 frame of FIGS. 8A and 8B. Compared to FIGS. 8A and 8B, FIGS. 8G and 8H, fuzziness, edges, and pixelation are reduced.

FIG. 9 illustrate an original image and two filtered images. The top image illustrates an original frame. The middle image illustrates the effects of a H.265 compressed frame. The bottom image illustrates the effects of using the progressive distortion removal model disclosed herein on the original image. Compared to the middle image, fuzziness, edges, and pixelation are reduced.

Existing codecs may be improved by replacing existing distortion removal techniques and not altering the distortion itself. In embodiments, the presently disclosed technology may be implemented as a stand-alone program. In addition to improving the quality compared to the standard filters, the network is applied in real time. Therefore, there would be no impact on runtime for existing decoders. The presently disclosed technology has the advantage of being able to handle multiple and untrained distortion quality levels in a better way, since the distortion quality level is incorporated into the network architecture and is considered as an additional parameter during training and testing. Rather than needing to train multiple models for each different distortion quality level, the presently disclosed approach handles multiple distortion quality levels in a single trained model without training on all distortion quality levels. This approach, thus, increases performance, as well as saves model training time, for increased efficiency and flexibility. It will be appreciated that the one or more techniques described above may be used alone or in combination to train the initial distortion removal model.

Figure 10:
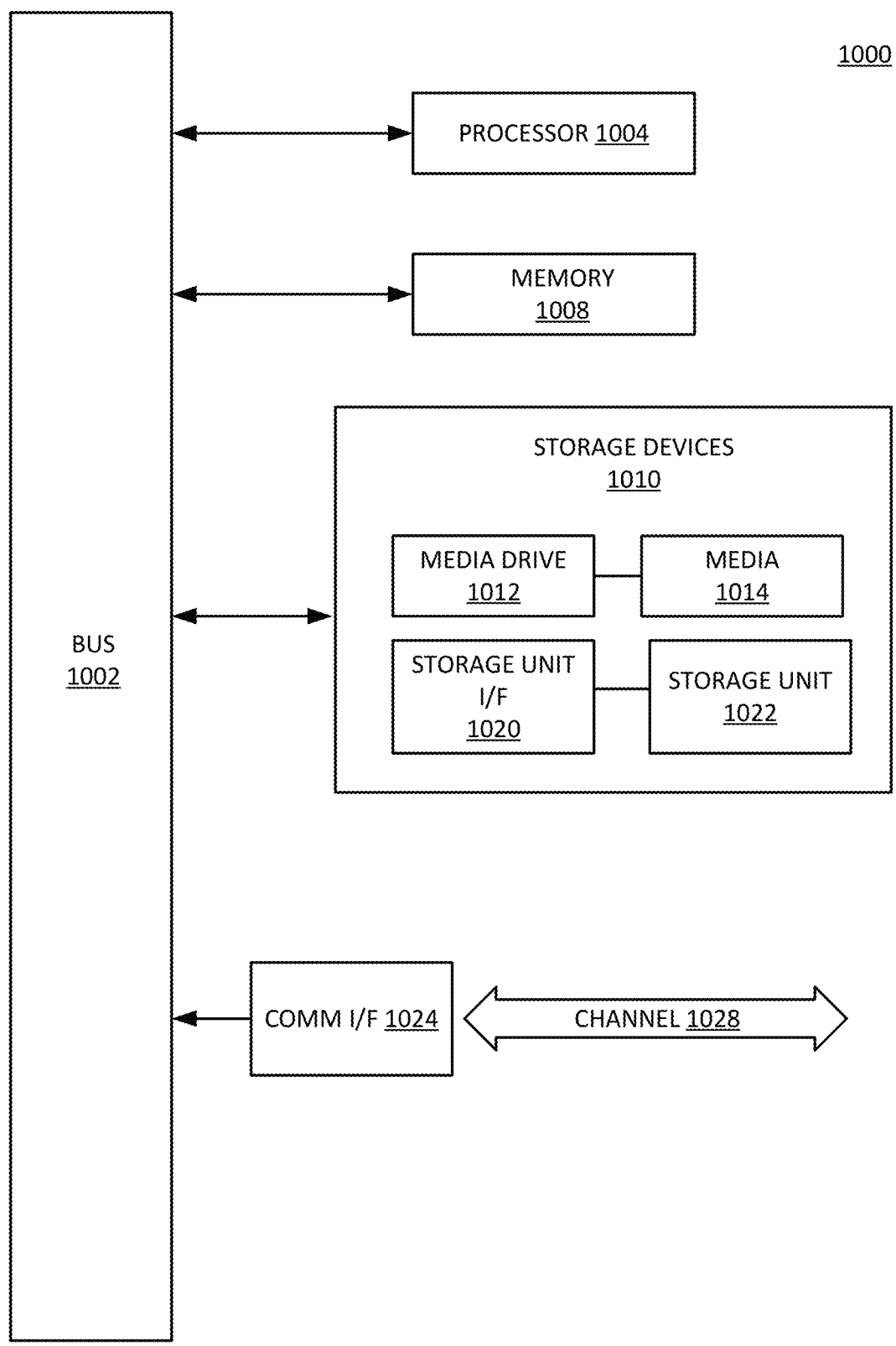
FIG. 10 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines, components, or components of the technology are implemented in whole or in part using software, in one embodiment, these software elements can be implemented to operate with a computing or processing component capable of carrying out the functionality described with respect thereto. One such example computing component is shown in FIG. 10. Various embodiments are described in terms of this example-computing component 1000. After reading this description, it will become apparent to a person skilled in the relevant art how to implement the technology using other computing components or architectures.

Referring now to FIG. 10, computing component 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 1000 might include, for example, one or more processors, controllers, control components, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing component 1000 or to communicate externally.

Computing component 1000 might also include one or more memory components, simply referred to herein as main memory 1008. For example, preferably random access memory (RAM) or other dynamic memory might be used for storing information and instructions to be executed by processor 1004. Main memory 1008 might also be used for storing temporary variables or other intermediate information during execution of instructions to be executed by processor 1004. Computing component 1000 might likewise include a read-only memory ("ROM") or other static storage device coupled to bus 1002 for storing static information and instructions for processor 1004.

The computing component 1000 might also include one or more various forms of information storage device 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot, a PCMCIA slot and card, and other fixed or removable storage units 1022 and interfaces 1020 that allow software and data to be transferred from the storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method, comprising:
    receiving training content, the training content comprising original content and reconstructed content, wherein the reconstructed content is derived from distorted original content;
    generating a plurality of training distortion quality levels based on the reconstructed content;
    receiving an initial distortion removal model;
    generating a conditioned distortion removal model by training the initial distortion removal model using the training content and the plurality of training distortion quality levels; and
    storing the conditioned distortion removal model.

2. The computer-implemented method of claim 1, further comprising:
    receiving target content, wherein the target content has one or more target distortion quality levels, wherein the plurality of training distortion quality levels includes at least one different value compared to the one or more target distortion quality levels; and
    applying the conditioned distortion removal model to the target content and the one or more target distortion quality levels to generate corrected target content.

3. The computer-implemented method of claim 2, wherein the initial distortion removal model or the conditioned distortion removal model comprise one or more user-defined output branches based on the one or more target distortion quality levels.

4. The computer-implemented method of claim 1, wherein the initial distortion removal model comprises two branches, wherein a first set of the training content corresponding to a first branch passes through a first set of convolutional layers, and a second set of the training content corresponding to a second branch passes through the first set of convolutional layers and a second set of convolutional layers.

5. The computer-implemented method of claim 4, wherein training the initial distortion removal model using the training content comprises:
    applying the first set of the training content to the first set of convolutional layers;
    applying at least one of the first set of the training content to the second set of convolution layers;
    applying the second set of the training content to the first set of convolutional layers and the second set of convolutional layers; and
    when the second branch is conditioned, training the first branch and the second branch with equal weighting applied to the first branch and the second branch.

6. The computer-implemented method of claim 1, wherein the initial distortion removal model or the conditioned distortion removal model comprises a convolutional neural network.

7. The computer-implemented method of claim 1, wherein the initial distortion removal model or the conditioned distortion removal model comprises an activation function.

8. The computer-implemented method of claim 1, wherein the conditioned distortion removal model is trained to remove distortions from the target content.

9. The computer-implemented method of claim 1, wherein the target content comprises one or more videos.

10. A computer-implemented method, comprising:
    receiving target content, wherein the target content has a plurality of target distortion quality levels;
    receiving a conditioned distortion removal model, the conditioned distortion removal model having been conditioned by training an initial distortion removal model using training content and a plurality of training distortion quality levels, wherein the training content comprises original content and reconstructed content derived from distorted original content, and wherein the plurality of training distortion quality levels are generated based on the reconstructed content; and applying the conditioned distortion removal model to the target content and the plurality of target distortion quality levels to generate corrected target content.

11. The computer-implemented method of claim 10, wherein the conditioned distortion removal model comprises one or more user-defined output branches based on the plurality of target distortion quality levels.

12. The computer-implemented method of claim 11, wherein the target content is corrected based on a given target distortion quality level of a given target content corresponding to one of the one or more user-defined output branches of the conditioned distortion removal model.

13. The computer-implemented method of claim 10, wherein the conditioned distortion removal model comprises two branches, wherein a first set of the target content corresponding to a first branch passes through a first set of convolutional layers, and a second set of the target content corresponding to a second branch passes through the first set of convolutional layers and a second set of convolutional layers.

14. The computer-implemented method of claim 10, wherein the initial distortion removal model or the conditioned distortion removal model comprises a convolutional neural network.

15. The computer-implemented method of claim 10, wherein the target content comprises one or more of an image or a video.

16. The computer-implemented method of claim 15, wherein the target content comprises one or more of standard content, high definition (HD) content, ultra HD (UHD) content, 4k UHD content, or 8k UHD content.

17. A system, comprising:
a memory storing one or more instructions; and
one or more processors that execute the one or more instructions to perform the steps of:
  obtaining target content, wherein the target content has a plurality of target distortion quality levels;
  obtaining a conditioned distortion removal model, the conditioned distortion removal model having been conditioned by training an initial distortion removal model using training content and a plurality of training distortion quality levels, wherein the training content comprises original content and reconstructed content derived from distorted original content, and wherein the plurality of training distortion quality levels are generated based on the reconstructed content; and
  applying the conditioned distortion removal model to the target content to generate corrected target content.

18. The system of claim 17, wherein the conditioned distortion removal model comprises one or more user-defined output branches based on the plurality of target distortion quality levels.

19. The system of claim 18, wherein the target content is corrected based on a given target distortion quality level of a given target content corresponding to one of the one or more user-defined output branches of the conditioned distortion removal model.

20. The system of claim 17, wherein the initial distortion removal model or the conditioned distortion removal model comprises a convolutional neural network.

* * * * *

UNITED STATES PATENT AND TRADEMARK OFFICE
CERTIFICATE OF CORRECTION

PATENT NO. : 10,832,383 B2
APPLICATION NO. : 16/167388
DATED : November 10, 2020
INVENTOR(S) : Christopher Schroers et al.

Page 1 of 1

It is certified that error appears in the above-identified patent and that said Letters Patent is hereby corrected as shown below:

On the Title Page

(73) Assignee:
Please delete "DISNEY ENTERPRISES, INC., Burbank, CA (US)" and insert --DISNEY ENTERPRISES, INC., Burbank, CA (US); ETH ZÜRICH (EIDGENÖSSISCHE TECHNISCHE HOCHSCHULE ZÜRICH), Zurich (CH)--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*